United States Patent Office 3,533,802
Patented Oct. 13, 1970

3,533,802
SUGAR-SHORTENING EMULSION AND
PROCESS OF MAKING SAME
Irwin Cooper, Staten Island, N.Y., Daniel Melnick, West Englewood, N.J., and Jack Akerboom, Wayland, Mass., assignors to CPC International Inc., a corporation of Delaware
No Drawing. Filed Mar. 2, 1967, Ser. No. 619,934
Int. Cl. A21d 8/02
U.S. Cl. 99—86
18 Claims

ABSTRACT OF THE DISCLOSURE

A stable oil-in-water emulsion, for use in the preparation of food products containing sugar and shortening, is prepared by emulsifying together a shortening, an aqueous sugar solution, and specified water-soluble or water-dispersible emulsifiers.

SPECIFICATION

This invention relates to stabilized emulsions of the oil-in-water type. In particular, the invention relates to novel emulsions comprising a fat base, emulsified in an aqueous solution of sugar, for use in the food industries and more particularly in the baking and confectionery industries.

Present commercial bakery operations, while much improved in recent years, require steps and handling techniques which are sometimes costly and time-consuming. The advent of liquid shortenings, and aqueous solutions of sugar known commercially as "liquid sugars," have resulted in simplified handling of these ingredients since they can now be metered into the batter formulation via pumps rather than having to be scooped out of a container, weighed and finally incorporated into the batter. Furthermore, temperature control through use of these ingredients became possible. The correlation between cake batter temperature and quality of finished cakes has been repeatedly demonstrated, clearly showing the importance of this type of control. As is usually the case in a commercial bake shop, batter temperatures are higher than desired and steps designed to remove heat are indicated. The introduction of aqueous solutions of sugar has provided to the commercial baker a convenient means for controlling batter temperatures, since it is possible to chill the sugar solution without causing sugar crystallization. Therefore, by reducing the temperature of the "liquid sugar," and adding same to the batter, the temperature of the batter may easily be lowered to the optimum degree. Conversely, if the batter temperature is considered too low, the aqueous sugar solution may be heated to produce the desired temperature of the batter. To an almost equal degree, the development of liquid shortenings also increased the baker's ability to control batter temeprature. These shortenings, being handled in liquid form and pumped from holding tank to batter, could more easily be heated or cooled than the plastic shortenings which dominated the industry before the introduction of these fluid products.

Although the advent of concentrated sugar solutions and shortenings which remain fluid at temperatures ranging as low as about 45° F. were significant developments which gave the baker much needed control, they are by no means the ultimate in convenience. The so-called liquid sugars, being a solution of sugar in water, combined these two integral ingredients thus essentially eliminating the need for separate water addition. However, two tanks and separate metering and heat control units are still required to handle the sugar-water system and the shortening system. Furthermore, the liquid shortening, usually being a blend of solid fraction fatty materials suspended in a limpid vegetable oil, has a tendency of depositing the hardened fraction on the bottom of the container. It therefore becomes necessary to provide agitation in the tank containing the shortening in order to guarantee that quantities drawn from the tank, for use, contain the proper concentrations of hard fraction (usually including the emulsifiers). An additional drawback to the present system is evidenced during clean-up operations of equipment containing or providing the shortening component. Such equipment becomes coated with an oil film which is readily oxidizable and difficult to remove. The cleaning of equipment, which consists of the tank, pipelines, pump and heat exchanger, involves the use of warm, soapy water followed by sufficient clean water to rinse off the soap and finally thorough drying of the system. These steps may be costly and time-consuming, thus resulting in a downtime of equipment, which could otherwise be utilizable. The same considerations apply to operations in the confectionery industry.

One object of the present invention is to provide a combination of several ingredients commonly used in commercial bakery and confectionary operations, in the form of a stable, pumpable emulsion.

Another object of the invention is to provide a practical, uniform, stable, pumpable, emulsified form of a combination of shortening and sugar solution that is particularly suited for use in commercial bakery or confectionery operations.

Another object of the invention is to provide a stable, practical emulsion of shortening in an aqueous solution of sugar, that can be easily stored in tanks or the like and which can be conveniently measured into a formulation via metering pumps.

Another object of the invention is to provide a stable, practical emulsion of shortening in an aqueous solution of sugar, that can be stored in tanks or the like and which can easily be rinsed by water washings off the inside walls of these tanks or containers used for storing same emulsion.

A further object of the invention is to provide a stable, fluid emulsion of shortening in an aqueous solution of sugar which will remain liquid at low temperatures, on the order of about 25° F.

Another object of the invention is to provide a stable, practical emulsion of shortening in an aqueous solution of sugar, that permits the commercial baker to prepare baked goods (either leavened or unleavened) in an extremely simple manner.

A further object of the invention is to provide a stable emulsion of shortening in an aqueous solution of sugar, that will result in products of greatly superior qualities, when used in the preparation of baked goods (e.g. cakes, bread, cookies, etc.), cream fillings, icings, candies and the like.

Another object is to develop a process for preparing a stable emulsion of sugar and shortening.

Other objects of the invention will be apparent hereinafter from the specification and from the recital of the appended claims.

This invention comprises preparing a stable emulsion of a shortening, an aqueous sugar solution, and one or more specified emulsifiers. First, these three classes of ingredients will be described in detail, and then the process for making the emulsion will be described. In the following description, all percentages and parts are by weight unless expressly stated otherwise.

THE SHORTENING

The shortening ingredient can be any material that is suitable for use as a shortening in baked goods, icings, cream fillings, or the like.

Within recent years, shortenings have been developed that permit the use in baked goods of a higher ratio of sugar to flour than was heretofore possible. These shortenings have found wide acceptance in the commercial manufacture of cakes or similar baked goods because they produce exceptionally fine cakes. In composition they are fats, either liquid or plastic at room temperature (i.e. about 75° F.) which contain one or more fat-soluble or fat-dispersible emulsifiers (hereinafter called of the "fat-soluble" type) such as, for example, monoglycerides, mixtures of mono- and di-glycerides, glycerol lacto palmitate or stearate, sorbitan monostearate, and the like. These shortenings are specifically designed to produce highly acceptable baked goods when used in conventional preparation of cakes.

Some commercially available shortenings of this type possess the property of being readily emulsifiable with an aqueous phase, without need of additional emulsifiers, to provide a water-in-oil type emulsion. Such emulsions are, however, firm and non-readily pumpable, certainly at low temperatures of below 50° F. Some shortenings, particularly liquid shortenings with added fat-soluble emulsifiers, can be used to make oil-in-water emulsions without the use of the added emulsifiers employed in our invention. Such an emulsion may even be fairly stable, and utilizable in the preparation of baked goods of fair acceptability. However, the added emulsifier(s) of the type and concentration we describe are needed to guarantee emulsion stability as well as provide an emulsion which produces superior cakes of the present invention.

The above-described shortenings (i.e. those which contain emulsifiers) are referred to hereinafter simply as "cake shortenings," since they produce superior cakes as compared to shortenings that do not contain emulsifiers. Because the greatest utility of emulsions prepared in accordance with the present invention is expected to be in the preparation of cakes or other goods in which a high ratio of sugar to flour is desirable, it is preferred to use a cake shortening as the shortening ingredient of an emulsion of the present invention. It should be noted, however, that the use of a cake shortening is in no way necessary either to the preparation or the stability of an emulsion according to the present invention. If the emulsion is to be used in a product in which a high ratio of sugar to flour is not needed or desirable, any shortening, with or without emulsifiers, can be used with complete success as the one of two basic ingredients in making our emulsions.

The shortening, that is selected for use, can be either liquid or plastic at room temperature, or a combination of liquid and plastic shortenings can be used. One advantage of using a liquid shortening is that the resulting emulsion will be more fluid and therefore easily pumpable, at refrigerator temperatures (viz 45° F.). The shortening can be derived from any source, i.e. vegetable, animal, or a mixture of vegetable and animal fats. The shortening should be present in an amount from about 10% to about 50% of the total emulsion, the preferred range being from about 15% to about 35%.

THE SUGAR SOLUTION

The sugar solution can be an aqueous solution of any sugar, such as, for example, sucrose, dextrose, levulose, invert sugar, lactose, etc., or a combination of two or more sugars. Starch hydrolysates, such as glucose syrup or corn syrup, can also be used, alone or in combination with the above-mentioned sugar solutions. Except for the fact that there must be sufficient water present to dissolve the sugar completely, so as to avoid sugar crystallization, the proportions of water and sugar are not critical. Problems such as microbiological spoilage may be encountered with very dilute sugar solutions, although this can be avoided by the addition of a microbiological preservative. Since the emulsion is ultimately to be used in the preparation of baked goods, cream fillings, icings, or the like, the water content should not be such that excessive water is introduced into the final product.

Starch hydrolysates such as corn syrup can be used either as the sole sugar or in combination with other sugars. However, low D.E. (dextrose equivalent) corn syrups are quite viscous; and if their viscosities will present problems to the ultimate user, such low D.E. syrups should be avoided or used sparingly. The so-called "liquid sugars," which are in fact aqueous solutions of sucrose or mixtures of sucrose with one or more sugars, such as dextrose or invert sugar, and which contain about 67% solids, are very suitable for use. For the most part, liquid sugars containing from 50% to 75% sugars are used.

The sugar solution may contain a quantity of a chelating agent, such as ethylenediaminetetraacetic acid (EDTA) or salts of the acid, for the purpose of immobilizing metal ions which otherwise are free to cause rancidity, off-flavors and even in some cases emulsion instability.

THE ADDED EMULSIFIER

It is important that the emulsion of this invention be of the oil-in-water, rather than the water-in-oil, type. Therefore, an emulsifier must be chosen which will favor such an emulsion. This is usually one which is either water-soluble or water-dispersible, hereinafter called of the "water-soluble" type. Obviously, of course, the emulsifier must also be edible.

The following emulsifiers of the water-soluble type have been found to be particularly suitable as the supplementary surface active agent performing the primary function of providing, to the fat globules, sufficient dispersive forces to effect gravitational stability of the finished emulsion. We have also observed that this added emulsifying agent, when properly formulated into the finished emulsion, works collaboratively with any emulsifying agents present in the shortening, as well as the shortening itself, to result in the product of our invention, which can be conveniently used in commercial baking operations to prepare baked goods of superior qualities.

(1) Water-soluble and water-dispersible emulsifiers containing polyoxyethylene chain(s) such as the partial fatty acid esters of polyhydric alcohols containing at least one polyoxyethylene chain, complete fatty acid esters of the condensation products of polyhydric alcohols and ethylene oxide in which all of the hydroxyl groups of the alcohols contain polyoxyethylene chains, partial fatty acid esters of polyoxyethylene glycol and complete fatty acid esters of polyoxyethylene glycol, the oxyethylene units per mol of each of said members being at least five and each fatty acid group in said members containing at least twelve carbon atoms. More specific examples of these emulsifiers are the partial fatty acid esters of polyoxyethylene sorbitan such as polyoxyethylene (20) sorbitan monostearate (also known as Polysorbate 60). These compounds are water-soluble, hydrophilic emulsifiers, and are readily available commercially.

(2) Certain commercial grades of glyceryl esters, particularly commercially available glyceryl mono-oleate, which is essentially a blend of glyceryl mono-oleate, glyceryl dioleate and potassium oleate. Such a product is sold by Glyco Chemical Company as "S-1787." The emulsifier is oil-soluble and water-dispersible, the potassium oleate fraction being water-soluble.

(3) Potassium oleate has been found to be effective as the added emulsifier when using some commercially available cake shortenings which already contain surface active agent(s) of the types which are suitable added emulsifiers, in accordance with the invention.

(4) Diacetyl tartaric acid esters of mono- and diglycerides of fat-forming fatty acids. A commercially available product of this type is sold by Hachmeister, Inc. under the mark TEM 4T. It consists of diacetyl tartaric acid esters of mono- and diglycerides of stearic and palmitic acids, and contains about 51% by weight hydrophilic and 49% lipophilic groups. The emulsifier dissolves in oil and is equally dispersible in water.

(5) Commercial soybean lecithin, which is a naturally occurring mixture of similar compounds identified as phosphatides or phospholipids, namely, lecithin (phosphatidyl choline), cephaline (phosphatidyl ethanolamine), lipositol or inositol phosphatides (phosphoinositides) and related phosphorus-containing lipids. One such product, manufactured by Yelkin Chemical Co. under the code "BTS," contains from 54% to 72% phosphatides dissolved in soybean oil. This product is soluble in oil and dispersible in water.

(6) Split lecithins, which are soluble in oil and dispersible in water. They are commercial lecithin products which have had the ratio of phosphatides changed in order to accentuate their separate emulsifying and surface active properties. These products are available commercially from various suppliers, including Central Soya Co. and Cleary Corp.

(7) Various mixtures and combinations of emulsifiers may also be used. A commercially available product, which is a blend of three parts glyceryl monostearate and one part stearyl-2-lactylic acid (sold under the trade name of Marvic acid), has been found particularly suitable.

The partial fatty acid esters of polyoxyethylene (20) sorbitan, which are water-soluble, are preferred, because such emulsifiers result in emulsions that have remarkable stability and that produce exceptionally fine baked goods, icings, and the like. Polyoxyethylene (20) sorbitan monostearate is a specific example of a preferred water-soluble emulsifier.

The amount of added emulsifier necessary depends, of course, upon the type of emulsifier used and the relative proportions of shortening and sugar solution. Generally, the higher the amount of shortening present, the greater the amount of the added emulsifier that is necessary. About 0.1% by weight of the total emulsion of partial fatty acid esters of polyoxyethylene (20) sorbitan is satisfactory for an emulsion containing 10% shortening; about 0.2% is adequate for one containing 20% shortening. At least 0.05% of such added emulsifiers is required and no more than 0.4% is required for emulsions containing up to 50% by weight of the fat component. With the less preferred emulsifiers, quantities as much as 2.5% by weight of the total emulsion are required.

If a cake shortening is used that already contains an emulsifier in a sufficient amount, it may be possible to prepare a satisfactory emulsion of the cake shortening and the sugar solution alone, without any added emulsifier. However, such emulsions and the resulting cakes are inferior to those of our invention. Addition of the emulsifiers of the water-soluble type set forth above, even when a cake shortening is used, results in better emulsion stability and superior baked goods.

PREPARATION AND USE OF THE EMULSION

In preparing the emulsions, it is important that all of the ingredients should be in liquid form at time of preparation. Therefore, if for example, the shortening used contains fat crystals at room temperature (about 75° F.), it must first be heated until all fat crystals are melted. If the shortening is heated, the sugar solution should also be heated to about the same temperature as that of the shortening. Also, when the emulsifier of the water-soluble type to be added has a higher melting point than that of the shortening, all the ingredients should be brought to that temperature at time of preparation. Most commercially available shortenings and emulsifiers are completely liquid at temperatures of from about 100° F. to about 120° F., therefore, if any heating of the ingredients is necessary, this temperature range will ordinarily be sufficient. The emulsifier of the water-soluble type can be added to either the shortening or the sugar solution. After the emulsifier has been added, the oil and aqueous phases are combined with agitation (preferably, the shortening is added to the sugar solution), thereby forming a premix. The premix is then vigorously agitated, or homogenized, in order to reduce the particle size of the fat globules, thus effecting emulsion stability. If the ingredients are heated prior to forming the emulsion, it is preferred to cool the finished emulsion rapidly, rather than slowly, to room temperature, in order to improve emulsion stability.

The emulsions thus formed are extremely stable, no separation occurring for at least two weeks. Some of the preferred emulsions are stable up to four months or more at normal storage temperatures (viz about 60 to about 80° F.). They are liquids, and therefore pumpable, at room temperature. If a liquid shortening is used, the resultant emulsion is easily pumpable at temperatures as low as about 25° F., even in the case of emulsions containing 35% or more shortening.

Two remarkably and totally unexpected advantageous features of the emulsions are first, that batters for baked goods can be prepared by simply placing all of the batter ingredients, i.e., the emulsion plus the other necessary ingredients (flour, eggs, milk, flavoring, coloring material, etc.) into a container at the same time and mixing, and secondly, that baked goods prepared using the emulsions have better appearance, texture and remain moist for a longer time than those prepared by conventional means.

The advantages of the first mentioned feature are obvious. Usually, cake batters are prepared by gradually adding the various ingredients in specific sequence, with continued mixing or beating. These steps have been found to be necessary in order to develop a proper batter emulsion which will result in an acceptable cake. When using the emulsion of the invention, all of the ingredients can simply be placed in a bowl, blended, and beaten for about three minutes. The batter is then ready to be placed in baking pans and baked. This eliminates the need for specific batter ingredient sequence of addition, thus greatly simplifying cake batter preparation.

The fact that baked goods prepared using the emulsion as the sole or primary source of sugar and shortening are superior to those of the prior art is totally unexpected. What is even more surprising is the fact that if the identical ingredients of the emulsion are used separately (ie., not in the form of an emulsion) in the preparation of baked goods, the resultant baked goods do not have the superior texture, appearance and shelf-life obtained through use of the emulsion. Apparently, some quality or qualities of the emulsion itself, rather than of the individual ingredients, are responsible for the improvements.

Another feature of our invention which we consider unusual is the fact that the aqueous phase of the emulsion, which is the continuous phase, has (or can have) a very high solids content (as high as about 75% dissolved sugars). It is unexpected that such an emulsion would remain stable for any appreciable period of time. Furthermore, because of this high solids content in the aqueous phase, the difference in specific gravities between the shortening and the solubilized sugar phase is greater than is normally encountered in emulsions of oil or fat in water. The specific gravity of the sugar solution is in the magnitude of about 1.3 while that of oils and fats is about 0.9. Despite this wide difference, resulting in a great tendency of the droplets of shortening to migrate to the surface of the pourable emulsion, we have found that the products of our invention remain gravitationally stable over comparatively long periods of time.

A further advantageous feature of the emulsions of the invention is that equipment in which they have been stored or used (e.g. storage tanks, pipelines, pumps, etc.) can be completely cleaned by merely rinsing off the sides of the equipment with a stream of water. The emulsions will not adhere to the sides of the equipment, necessitating soap and water scrubbing.

In addition to baked goods (e.g. cakes, breads, cookies) exceptionally fine icings, cream fillings, candies and the like can be easily prepared using our emulsion. All that is necessary in the preparation of icings and the like is to inject finely dispersed gas (e.g. air) into the emulsion, as by whipping it with a mechanical beater, until it becomes stiff. Dry material such as confectioners sugar, starch, or the like, plus coloring and/or flavoring materials, may then be added to the whip to give the desired consistency, appearance and taste.

The following examples will illustrate the practice of the invention; they are presented for illustrative purposes only and should not be interpreted as limiting the scope of the invention in any way.

EXAMPLE I

This example illustrates the preparation of an emulsion in accordance with the invention and demonstrates its use in the preparation of icings and baked goods.

The emulsion (which is designated hereinafter by the letter "C") was prepared using the following ingredients: 80 parts of an aqueous sucrose solution containing about 67% by weight of sucrose solids, 19.8 parts of a commercially available liquid cake shortening which consists of refined vegetable oils plus, as emulsifiers, glyceryl-lacto esters of fatty acids and mono- and diglycerides; 0.2% of polyoxyethylene (20) sorbitan monostearate as added emulsifier. Preparation was as follows. The shortening (which was pourable but cloudy at room temperature) was heated to about 110° F. and the emulsifier was added. The resultant mixture was then added, with agitation, to the sugar solution, which had also been heated to about 110° F. The resultant premix was passed through a colloid mill and then into a scraping blade heat exchanger where it was rapidly cooled to about 70° F.

The emulsion so prepared was extremely stable, no separation of the components occurring during more than 4 months. It was readily pourable at temperatures as low as 25° F.

An icing was prepared with the emulsion using the following procedure. The emulsion was chilled to about 45° F., whipped at high speed with a mechanical beater for about 8 minutes, and then sufficient confectioners sugar was added, with continued beating, to give the desired consistency. The icing was excellent; it was light in texture and sufficiently stiff to maintain peaks; flavor was also excellent.

The emulsion was then tested for performance in the preparation of baked goods. Three cakes were prepared, two (designated as A and B) being the controls and the third (designated as C) being prepared using the emulsion.

Control cake A was prepared using the following recipe.

| Ingredients: | Amount (gms.) |
| --- | --- |
| Commercially available "liquid sugar" (67° Brix aqueous sugar solution) | 440.0 |
| Liquid cake shortening (the same as used in the emulsion) | 110.0 |
| Egg whites | 91.0 |
| Cake flour | 243.0 |
| Baking powder | 13.0 |
| Salt | 2.0 |
| Non-fat dry milk | 23.0 |
| Water | 84.0 |
| Total | 1,006.0 |

The following conventional process was used to prepare the cake:

(1) Liquid shortening and all sifted dry ingredients were placed in the mixing bowl of a three speed Hobart mixer, the liquid sugar was added and the mixture was mixed at medium speed for 1½ minutes.

(2) Two-thirds of the water was added and mixed at medium speed for 1½ additional minutes.

(3) One-half of egg whites added, mixed 2½ minutes at medium speed.

(4) Remaining egg whites added, mixed at low speed for additional 1½ minutes.

(5) Remaining water added, mixed at low speed for 2½ minutes.

(6) Batter poured into 8-inch baking tins (475 gms. per tin) and baked at 350° F. for 37 minutes.

Control cake B was prepared using the identical ingredients as A plus about 1.1 gm. of polyoxyethylene (20) sorbitan monostearate. The method of preparation was identical to that of cake A.

Cake C was then prepared using 550 gms. of the emulsion in place of the liquid sugar and shortening of cake A; otherwise the batter recipe was identical to that of A. The cake was prepared as follows: *All* of the ingredients were placed in the mixing bowl and blended at low speed for 1 minute, then beaten at medium speed for 3 minutes. The batter was poured into 8-inch baking tins (475 gms. per tin) and baked at 350° F. for 37 minutes.

The three cakes were then evaluated as to volume, flavor, texture, moisture, and appearance. Cake C was obviously superior to the other two. It had an excellent flavor, a layer volume of 83.1 cubic inches, and an extremely moist, tender, "feathery" texture. Each layer was high and very symmetrical in appearance. Cake B also had an excellent flavor but a smaller layer volume (76.8 cubic inches) than C. Its texture was good, but not as moist and tender as that of C. The layers were also symmetrical and similar in appearance to C although not quite as symmetrical as C. Cake A had a good flavor, but a layer volume of only 63.1 cubic inches. The layers were poor in appearance, being unsymmetrical and sunken in the centers. The texture was decidedly heavier, and less moist than that of C. The following overall ratings were given to the three cakes: C, excellent; B, good; A, poor.

EXAMPLE II

A series of emulsions (designated by the letters D through J) was prepared in accordance with the invention, using various shortenings and added emulsifiers, which are set forth in Table 1. In all cases, the sugar solution used was the same as was used in Example I (a 67° Brix sucrose solution). In preparing emulsions D through I, wherein plastic shortenings were used, the shortening was first heated until liquid and the emulsifier added; the mixture was added with agitation to the sugar solution, which had been heated to about the same temperature as the shortening; the premix was then homogenized in a colloid mill and the resultant emulsion was rapidly cooled to room temperature. Emulsion J was prepared in similar manner, the ingredients being heated to a temperature at which the added emulsifier was in liquid form.

The stability of the emulsions (at room temperature) is reported in Table 1. Emulsions D through I, which were prepared with plastic shortenings, were liquid and easily pumpable at 70° F., but were not pumpable at temperatures as low as 25° F. Emulsion J, prepared from a liquid shortening, was pumpable at 25° F.

Icings prepared with any of the emulsions, using the procedure set forth in Example I, were excellent.

Cakes were prepared in identical manner as cake C of Example I, and were all high and symmetrical in appearance. The layer volumes and overall evaluations of the cakes on the basis of flavor, moisture and texture, are given in Table 1. As can be seen from Table 1, all of the emulsions produced cakes superior to cake A of Example I, which was prepared in conventional manner using conventional ingredients.

TABLE 1

[Note: All percentages and parts are by weight]

| Amt. of sugar soln. | D 80% | E 80% | F 80% | G 80% | H 80% | I 80% | J 80% |
|---|---|---|---|---|---|---|---|
| Description of shortening | (1) | (1) | (1) | Commercially available conventional plastic shortening containing no emulsifiers. | (1) | (1) | Liquid refined cornoil, containing no emulsifier. |
| Amount of shortening | 19.25% | 19.44% | 19.25% | 19.0% | 19.25% | 19.0% | 18.0%. |
| Description of added emulsifier(s) | Commercial grade of glyceryl mono-oleate, which also contains glyceryl dioleate and potassium oleate. | Diacetyl tartaric acid esters of mono- and di-glycerides of stearic and palmitic acids. | Soybean lecithin-commercial grade. | Split lecithins-lipositol plus cephalin concentrate. | Split lecithins-phosphatidyl choline plus cephalin concentrate. | Blend of 3 parts of the emulsifiers used in D, 1 part polyoxyethylene (20) sorbitan monostearate. | Blend of 3 parts of glyceryl monostearate, part Marvic acid. |
| Amount of added emulsifier | 0.75% | 0.56% | 0.75% | 1.0% | 0.75% | 1.0% | 2.0%. |
| Stability of emulsion | 4 months | 2 weeks | 1 month | 2 weeks | 1 month | 1 month | 1 month. |
| Layer volume of cakes (cu. in.) | 63.0 | 75.0 | 67.0 | 70.0 | 78.0 | 80.0 | 80.0. |
| Overall evaluation of cakes | Fair | Very Good | Fair | Good | Very good | Excellent | Very good. |

¹ Commercially available plastic cake shortening comprising a vegetable oil partially hydrogenated to an Iodine Value of about 68, blended with a more hardened fraction of vegetable oil plus 1 or more oil-soluble emulsifiers in amount of about 5%, to result in a finished blend having a Melting Point of about 113° F.

EXAMPLE III

Emulsions identical to C through J of Examples I and II were prepared, except in all cases the sugar solution employed was an aqueous solution of about 40% sucrose, 27% dextrose, and 33% water. The resulting emulsions, and the cakes and icings prepared therewith, were substantially identical to those using all sucrose.

EXAMPLE IV

An emulsion was prepared using the same ingredients as were used in emulsion C of Example I, except the proportions of the ingredients were changed as follows:

|   | Percent |
|---|---|
| Sugar solution | 66.5 |
| Shortening | 33.3 |
| Emulsifier | 0.2 |

The emulsion was stable for more than four months, and remained liquid at 25° F. Icings prepared using the emulsion were excellent. A cake was prepared using the same recipe and procedure as given for emulsion C of Example I. The cake was in all respects identical to that of cake C. This was somewhat surprising, as it was thought that altering the proportions of sugar and shortening would necessitate alterations in the cake recipe.

This example illustrates, therefore, another unexpected feature of the invention, viz that when our emulsions are used in baked products, the exact proportions of batter ingredients are less critical than when using sugars and shortenings of the prior art.

It follows then, that an emulsion prepared in accordance with our invention can be used for a wide variety of different types of baked goods, with few, if any, adjustments being made in the recipes.

Other emulsions were prepared, using the same ingredients as those of emulsion C but varying the proportions of shortenings and sugar solutions between the ranges of 10% shortening/90% sugar solution and 50% shortening/50% sugar solution. The emulsions were all stable for more than four months and remained liquid at 25° F.

Cakes were then prepared with the emulsions, in some cases making necessary adjustments in the recipes to compensate for the fat, sugar and water contributed by the different emulsions varying in liquid sugar/shortening ratios. In all cases, the cakes were rated "excellent" with respect to volume, appearance, texture, moisture and flavor.

Emulsions were also prepared using aqueous sugar solutions having various solids contents; again the emulsions were extremely stable, and excellent cakes could be prepared therewith.

We prefer to use a 67° Brix sugar solution primarily because such solutions are readily available commercially. We prefer to use about 80% of the sugar solution and about 20% shortening in our emulsion because this appears to result in the best "universal" emulsion, i.e., it can be used in an extremely wide range of commercial baked goods recipes as the sole source of sugar and shortening.

In the course of the present investigations, it was apparent that storage in tanks of liquid shortenings of the conventional type or of the customary solid shortenings in the melted liquid state, creates flavor stability problems which are solved by using the emulsions of the present invention. In the first place, the conventional oil and fat products are in direct contact with the metal walls of the iron tanks. Contact metal catalysis accentuates oxidation of the fats, particularly as the level of the shortenings in the tank drops with continued use, leaving behind a highly susceptible oil film exposed to air. Washing off this oil film is a problem. Warm soapy water has to be first employed, followed by fresh water washings to rinse off the soap and finally the system has to be dried. Polymerized oil may coat parts of the equipment to be washed and such oil is removed with great difficulty by the soap solutions despite vigorous agitation. Intermittent use of the equipment (the tanks, pipelines, pump and heat exchanger) is a factor in producing the oxidized and/or polymerized oil films which are objectionable in flavor and difficult to remove.

On the other hand, when the emulsions of our invention are used, particularly the preferred emulsions, the above problems are circumvented. The oil and fat phases of our emulsions are not in direct contact with the metal equipment. Our emulsions are of the stable oil-in-water type and so contact metal catalysis does not operate with our emulsions; oxidative off-flavors due to this cause are eliminated. The addition of 100 p.p.m. of calcium disodium ethylenediaminetetraacetic acid to our emulsions, the chelating agent ending up in solution in the continuous aqueous phase, provides exceptional protection against the oxidation catalyzed by trace metal contaminants contributed by low cost equipment of the black iron type. Finally, all equipment coming into contact with our emulsions (tanks, pipelines, pump and heat exchanger) are easily cleaned by water washings. The equipment is coated with only the aqueous phase of the emulsions and this coating is easily rinsed off by simply directing a stream of water on the walls of the equipment. Hence, the equipment used to handle the emulsions of our invention is easily maintained free from oxidized and/or polymerized oil films of objectionable flavor.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. As a new composition of matter a stable oil-in-water emulsion consisting essentially of:
   from about 10% to about 50% by weight of shortening;
   from about 90% to about 50% by weight of an aqueous sugar solution, containing from about 50% to about 75% dissolved sugar;
   and from about 0.05% to about 2.5% by weight of an added edible emulsifier of the water-soluble type.

2. An emulsion in accordance with claim 1 wherein said shortening contains emulsifiers of the fat-soluble type.

3. An emulsion in accordance with claim 1 wherein said shortening is present in an amount from about 15% to about 35%, and said sugar solution is present in an amount of from about 85% to about 65%.

4. An emulsion in accordance with claim 1 wherein said shortening is in liquid form at room temperature.

5. An emulsion in accordance with claim 1 wherein said shortening is in plastic form at room temperature.

6. An emulsion in accordance with claim 3 wherein said added edible emulsifier is a water-soluble, partial fatty acid ester of polyoxyethylene sorbitan.

7. An emulsion in accordance with claim 6 wherein said added edible emulsifier is polyoxyethylene (20) sorbitan monostearate.

8. An emulsion in accordance with claim 1 wherein said sugar solution contains about 67% by weight of sucrose.

9. An emulsion in accordance with claim 1 wherein said sugar solution contains about 40% by weight of sucrose and about 27% by weight of dextrose.

10. As a new composition of matter a stable oil-in-water emulsion consisting essentially of:
    about 20% by weight of a shortening consisting essentially of refined vegetable oil containing a minor amount of glyceryl lacto esters of fatty acids and mono- and diglycerides;
    about 80% by weight of an aqueous sugar solution containing about 67% by weight of sucrose; and
    about 0.2% by weight of polyoxyethylene (20) sorbitan monostearate.

11. As a new composition of matter a stable oil-in-water emulsion consisting essentially of:
    about 20% by weight of a shortening consisting essentially of refined vegetable oil containing a minor amount of glyceryl lacto esters of fatty acids and mono- and diglycerides;
    about 80% by weight of an aqueous sugar solution containing about 40% by weight of sucrose and about 27% by weight of dextrose; and
    about 0.2% by weight of polyoxyethylene (20) sorbitan monostearate.

12. Process for preparing baked goods comprising mixing together an emulsion in accordance with claim 1 with flour and subsequently baking the resultant batter.

13. Process for preparing leavened baked goods of superior quality comprising mixing together the following ingredients:
    an emulsion in accordance with claim 1;
    flour; and
    a leavening agent;
    and subsequently baking the resulting batter.

14. Process for preparing a cake comprising mixing together the following ingredients:
    an emulsion in accordance with claim 1;
    cake flour;
    a leavening agent;
    eggs; and
    milk;
    and subsequently baking the resultant batter.

15. A process for preparing an icing comprising incorporating finely dispersed gas into an emulsion in accordance with claim 1, and subsequently adding a sufficient amount of a dry, edible material to give the resultant product the desired consistency.

16. Process for preparing an oil-in-water emulsion comprising the following steps:
    (1) blending
        from about 0.05 part to about 2.5 parts of an edible emulsifier of the water-soluble type into from about 15 parts to about 35 parts of shortening,
    (2) adding, with agitation, the resultant blend to from about 85 parts to about 65 parts of an aqueous sugar solution, said sugar solution containing from about 50% to about 75% dissolved sugar, thereby forming a premix, and
    (3) homogenizing said premix.

17. The process in accordance with claim 16, wherein said emulsifier, said shortening and said sugar solution are all heated to approximately the same temperature when they are combined with each other, said temperature being sufficiently high to insure no fat crystals being present in the blend of shortening and emulsifier, and wherein the final emulsion, after the homogenization step, is rapidly cooled to room temperature.

18. The process in accordance with claim 17 wherein the ingredients are heated to from about 100° F. to about 120° F.

References Cited

UNITED STATES PATENTS

| | | | |
|---|---|---|---|
| 2,197,820 | 4/1940 | Voss | 99—92 |
| 2,694,643 | 11/1954 | Robinson et al. | 99—123 |
| 2,786,765 | 3/1957 | Prince | 99—123 XR |
| 3,366,494 | 1/1968 | Bower et al. | 99—142 |

LIONEL M. SHAPIRO, Primary Examiner

J. R. HOFFMAN, Assistant Examiner

U.S. Cl. X.R.

99—90, 92, 123, 139; 252—312